United States Patent
Yazaki et al.

(10) Patent No.: US 9,016,427 B2
(45) Date of Patent: Apr. 28, 2015

(54) BODY COVER SYSTEM FOR A SMALL VEHICLE, AND VEHICLE INCLUDING SAME

(71) Applicant: Honda Motor Co., Ltd., Minato-ku, Tokyo (JP)

(72) Inventors: Masaya Yazaki, Asaka (JP); Hiroshi Kuribara, Asaka (JP); Yoshitaka Hayama, Kumamoto (JP); Takaaki Kasai, Shiki (JP)

(73) Assignee: Honda Motor Co., Ltd., Tokyo (JP)

(*) Notice: Subject to any disclaimer, the term of this patent is extended or adjusted under 35 U.S.C. 154(b) by 34 days.

(21) Appl. No.: 13/765,202

(22) Filed: Feb. 12, 2013

(65) Prior Publication Data

US 2013/0220724 A1   Aug. 29, 2013

(30) Foreign Application Priority Data

Feb. 27, 2012   (JP) ................................. 2012-040551

(51) Int. Cl.
*B62K 11/04* (2006.01)
*B62K 11/00* (2006.01)
*B60R 13/08* (2006.01)
*B62J 23/00* (2006.01)

(52) U.S. Cl.
CPC ............ *B62K 11/00* (2013.01); *B60R 13/0876* (2013.01); *B62J 23/00* (2013.01)

(58) Field of Classification Search
CPC ............... B60K 13/04; B60R 13/0876; B62D 25/2054; B62K 11/04; F01N 13/08
USPC ........ 180/309, 291, 296, 89.2, 225; 296/39.3, 296/184.1
See application file for complete search history.

(56) References Cited

U.S. PATENT DOCUMENTS

| | | | | |
|---|---|---|---|---|
| 4,334,589 A * | 6/1982 | Asakura et al. | ............... | 180/219 |
| 4,359,126 A * | 11/1982 | Aiba | ............................. | 180/219 |
| 5,016,725 A * | 5/1991 | Muramatsu | ................... | 180/225 |
| 5,360,081 A * | 11/1994 | Takegami | ..................... | 180/309 |
| 5,376,341 A * | 12/1994 | Gulati | ........................... | 422/179 |
| 6,530,443 B1 * | 3/2003 | Tsuruta et al. | ............... | 180/89.2 |
| 7,360,620 B2 * | 4/2008 | Takenaka et al. | ............ | 180/291 |
| 7,448,463 B1 * | 11/2008 | Darmody | ...................... | 180/309 |
| 2002/0153187 A1 * | 10/2002 | Tsukui et al. | ................. | 180/219 |

* cited by examiner

*Primary Examiner* — Frank Vanaman
(74) *Attorney, Agent, or Firm* — Carrier Blackman & Associates, P.C.; William D. Blackman; Joseph P. Carrier

(57) ABSTRACT

A motorcycle is provided with vehicle frame, an internal combustion engine operatively attached to the vehicle frame, and an exhaust system for routing exhaust gas from the engine therethrough. The motorcycle also includes a body cover that covers at least a lateral side portion of the engine and constitutes an outer face of the vehicle, and a heat shield having a face closely adjacent and visually continuous to the body cover, the heat shield covering a lateral side portion of the exhaust system. The heat shield and the body cover cooperate to configure the external face of the vehicle, and the heat shield is mounted to the exhaust system. The body cover is formed of a plastic material, and the heat shield is made of metal. The body cover and heat shield cooperate to provide an improved vehicle appearance.

15 Claims, 18 Drawing Sheets

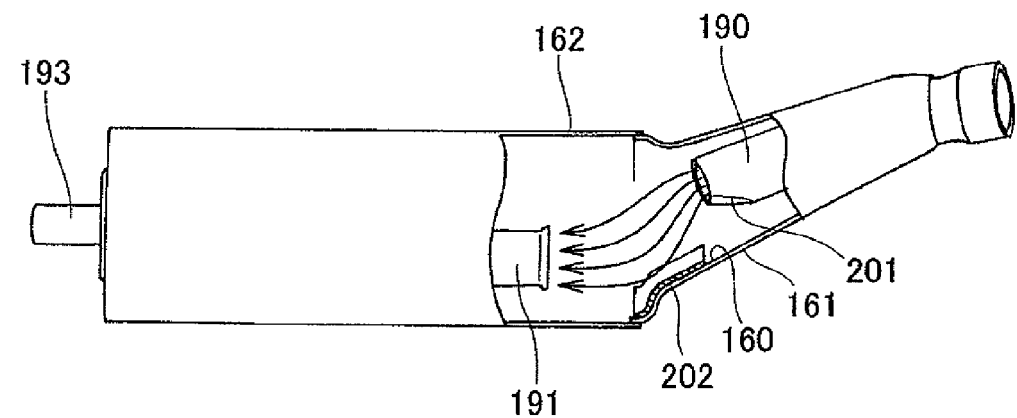
FIG. 21A     EMBODIMENT
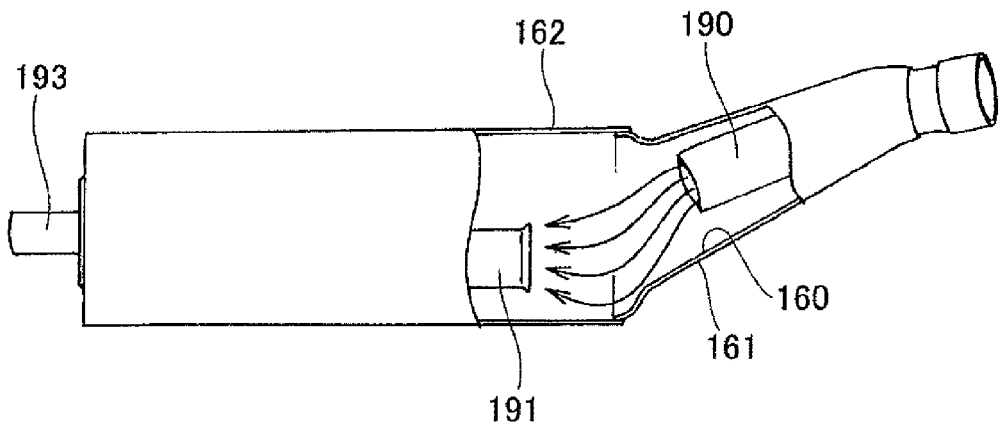
FIG. 21B    COMPARATIVE EXAMPLE

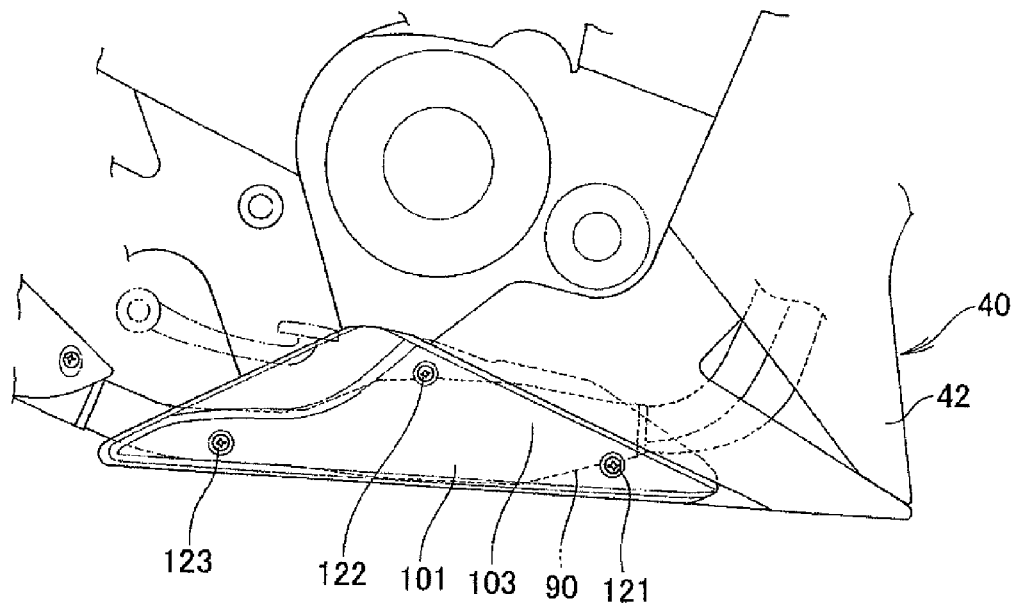
FIG. 23A    EMBODIMENT
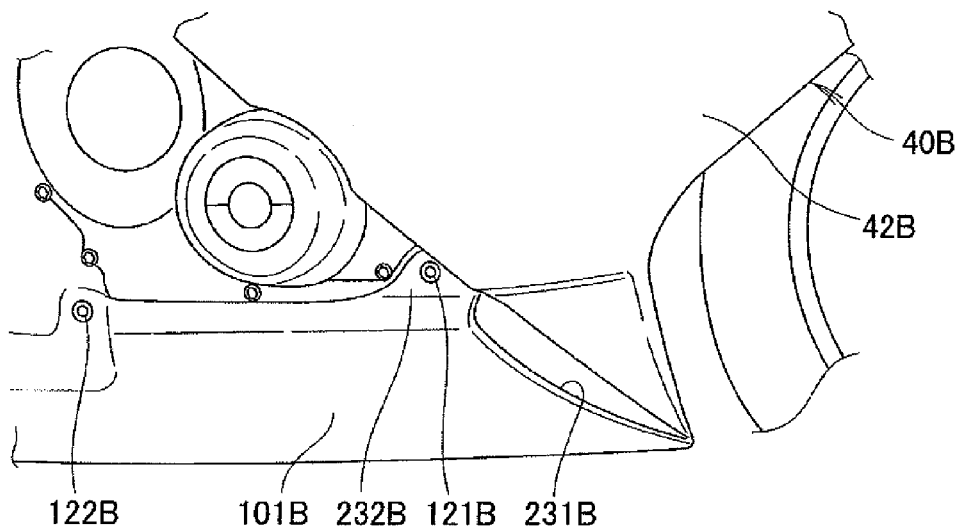
FIG. 23B    COMPARATIVE EXAMPLE

US 9,016,427 B2

BODY COVER SYSTEM FOR A SMALL VEHICLE, AND VEHICLE INCLUDING SAME

CROSS-REFERENCE TO RELATED APPLICATIONS

The present invention claims priority under 35 USC 119 based on Japanese patent application No. 2012-040551, filed on Feb. 27, 2012. The entire subject matter of this priority document, including the specification, claims and drawings thereof, is incorporated by reference herein.

BACKGROUND OF THE INVENTION

1. Technical Field

The present invention relates to a body cover system for a small vehicle, and to a small vehicle equipped with a body cover covering part of a vehicle body including an exhaust system.

2. Background Art

Some examples of small vehicles respectively equipped with a body cover for shielding an exhaust system are known (see, e.g. JP Patent No. 3727641 (FIG. 1, FIG. 2 and FIG. 4)).

As shown in Fig. 1 of JP Patent No. 3727641, underneath an engine (40) (parenthesized numerals are reference signs used in JP Patent No. 3727641; the names of some elements are altered herein; the same applies hereinafter), an exhaust system (70) is arranged, and outward from this exhaust system (70) in the direction of the vehicle width, a lower cowl (121) is arranged. The lower cowl (121) (hereinafter referred to as the heat shield (121)) covers the exhaust system (70).

As shown in Fig. 2 and Fig. 4 of Japanese Patent JP Patent No. 3727641, the upper parts of heat shields (121) whose mounting parts are fastened with set screws (124 and 124) to a body frame (20) extend to the inside of the vehicle until they reach the body frame (20). As the heat shields (121) extend to the inside of the vehicle, the degree of freedom in shape of the heat shields (121) is restricted.

On the other hand, the degree of freedom in shape of a mid-cowl (111) that covers the body above the heat shields (121) is secured because it does not have to cover the exhaust system. However, the heat shields (121) and the mid-cowl (111) do not cooperate to define an exterior surface in this reference. In order to configure an exterior surface between the heat shields (121) and the mid-cowl, the mid-cowl (111) requires shape alignment with the heat shields (121) in a boundary, and this entails restriction on the degree of freedom in shape.

Therefore, a technology is needed by which a high-quality vehicle appearance is ensured, while maintaining freedom in the shape of both the body cover and the heat shields.

It is, therefore, an object of the present invention to provide an improved technology for small vehicles provided with heat shields to cover the exhaust system, by which a high-quality vehicle appearance is ensured, while maintaining a high degree of freedom in the shape of both the body cover and the heat shields.

SUMMARY OF THE INVENTION

According to a first aspect of the present invention, a small vehicle includes an internal combustion engine, an exhaust system that extends downward from the internal combustion engine for routing exhaust gas from the internal combustion engine therethrough. The vehicle also includes a body cover that covers at least lateral sides of the internal combustion engine and constitutes an external face of the vehicle, wherein a heat shield is provided, the heat shield having a face closely adjacent and visually continuous to the body cover and covering a lateral side of the exhaust system, and the heat shield and the body cover configuring in cooperation with each other the external face of the vehicle; and the heat shield is mounted to the exhaust system.

According to a second aspect of the present invention, the body cover is formed of plastic, and the heat shield is molded of metal and mounted to the exhaust system via a plurality of heat tolerant, vibration damping elastic members.

According to a third aspect of the present invention, the small vehicle further includes a body frame, and the body cover is mounted to the body frame.

According to a fourth aspect of the present invention, the exhaust system has a catalytic converter containing a catalyst inside, and the heat shield is held by an upper part and a lower part of the catalytic converter.

According to a fifth aspect of the present invention, the exhaust system has an upstream exhaust pipe connected to a front end part of the catalytic converter and a downstream exhaust pipe connected to a rear end part of the catalytic converter, and further the heat shield is held by either of these upstream exhaust pipe and downstream exhaust pipe.

According to a sixth aspect of the present invention, the heat shield is formed in a substantially triangular shape in a side view of the vehicle to cover the whole catalytic converter.

According to a seventh aspect of the present invention, the heat shield is formed in a tabular shape, and also partially formed with a recess.

According to an eighth aspect of the present invention, a sensor is mounted to the catalytic converter, and the heat shield is formed to cover the sensor together with the catalytic converter.

ADVANTAGES OF THE INVENTION

According to first aspect of the present invention, the heat shield, covering lateral sides of the exhaust system, has a face closely adjacent and visually continuous to the body cover, and therefore, it is possible to smoothly visually connect the face of the heat shield and the face of the body cover. There is no need to give the body cover a shape to cover and conceal the exhaust system, and the degree of freedom in shape of the body cover can be enhanced.

Further, the heat shield is mounted to the exhaust system and positioned laterally outside of the body frame. As the heat shield is mounted to the exhaust system laterally outside of the body frame, there is no need to extend part of the heat shield. As a result, the degree of freedom in shape of the heat shield can be enhanced. Accordingly, the invention can ensure appearance quality for the vehicle while enhancing the degree of freedom in shape of both the body cover and the heat shields.

According to the second aspect of the present invention, the heat shield is molded of metal and mounted to the exhaust system via a plurality of heat tolerant, vibration damping elastic members. The elastic members interposed between the heat shield and the exhaust system make it difficult for vibration to be transmitted from the exhaust system to the heat shield via the elastic member, and also resist transmission of vibration from the heat shield to cause a resonance phenomenon with respect to the exhaust system.

According to the third aspect of the present invention, the body cover is mounted to the body frame, and the heat shield is mounted to the exhaust system via the vibration damping elastic members. If different supporting members are used for the body cover and for the heat shield, there is a possibility that a gap or the like is generated in a joining part between the body cover and the heat shield by vibration or the like generated in the vehicle.

In this respect, as the heat shield is mounted to the exhaust system via the elastic members according to the invention, minute shifting of the heat shield is permissible, and it is made possible to generation of a gap or the like in the joining part between the body cover and the heat shield.

According to the fourth aspect of the present invention, the exhaust system has a catalytic converter, and the heat shield is held by the upper part and the lower part of the catalytic converter. As the heat shield is held in two upper and lower positions, the mounting rigidity of the heat shield against up-and-down vibration can be enhanced.

According to the fifth aspect of the present invention, the heat shield, in addition to being held by the upper part and the lower part of the catalytic converter, is held by the upstream exhaust pipe or the downstream exhaust pipe. Since the front part or the rear part of the heat shield is held, the mounting rigidity of the heat shield can also be enhanced against the oscillation in the vehicle width direction at the time of turning (run-out) in addition to the up-and-down vibration applied to the heat shield.

According to the sixth aspect of the present invention, the heat shield is formed in a substantially triangular shape to cover the whole catalytic converter. The catalytic converter is arranged at the center of the substantially triangular heat shield to have the catalytic converter held in a position close to the apex of the substantially triangular heat shield. In addition to covering the whole catalytic converter with the substantially triangular heat shield, the heat shield can be securely supported by the catalytic converter.

According to the seventh aspect of the present invention, the heat shield is formed in a tabular shape, and partially formed with a recess. The recess serves to enhance the rigidity of the heat shield. The enhanced rigidity of the heat shield contributes to further restraint on resonance with the catalytic converter.

According to the eighth aspect of the present invention, a sensor is mounted the catalytic converter, and the heat shield is formed to cover the sensor together with the catalytic converter. Namely, the catalytic converter and the sensor are covered by the heat shield. Since no dedicated component is required to separately cover the sensor, an increase in the number of components can be restrained.

BRIEF DESCRIPTION OF THE DRAWINGS

FIG. 21A is a top plan view, partially cut away, illustrating flow characteristics of the muffler according to an illustrative embodiment.

FIG. 21B is a top plan view, partially cut away, illustrating flow characteristics of the muffler according to a comparative example, omitting certain structural features of the inventive embodiment.

FIG. 23A is a side plan view illustrating the visual continuity between the heat shield and the vehicle body cover according to an illustrative embodiment of the invention; and FIG. 23B is a side plan view of a heat shield and a vehicle body cover according to a comparative example, showing a lack of visual continuity.

DETAILED DESCRIPTION OF ILLUSTRATIVE EMBODIMENTS

Figure 1:
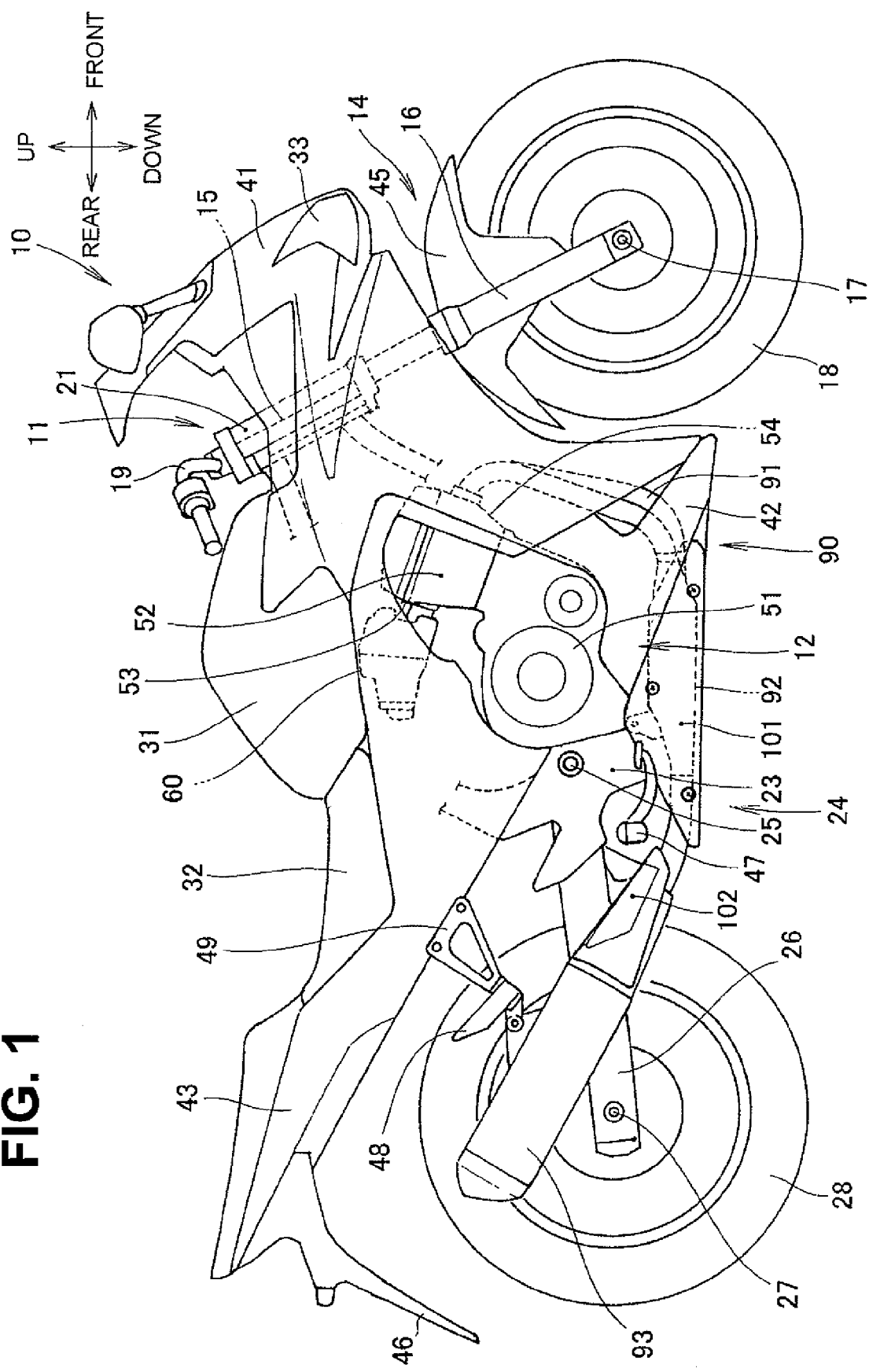
FIG. 1 shows a right side profile of a motorcycle pertaining to the present invention.

Embodiments of the present invention will be described in detail below. In the drawings and embodiments, "up", "down", "front", "rear", "left" and "right" refer to the respective directions as viewed by a rider riding on the motorcycle.

First, an embodiment the present invention will be described with reference to drawings.

As shown in FIG. 1, a motorcycle 10 is a small vehicle including as main elements, a body frame 11, an engine 12 as an internal combustion engine suspended from the body frame 11, a front wheel steering section 14 rotatably mounted to a head pipe 21 at a front end of the body frame, a rear wheel suspending unit 24 reciprocally mounted to a pivot frame 23 of the body frame 11, a fuel tank 31 mounted on the body frame 11 above the engine 12, and a seat 32 mounted on the body frame 11 behind the fuel tank 31 to let an occupant sit on.

The front wheel steering section 14 includes a steering shaft 15, a steering handlebar 19 mounted to the upper part of the steering shaft 15, a front fork 16 extending downward from the steering shaft 15, a front wheel shaft 17 spanning in the vehicle width direction at the lower end of the front fork 16, and a front wheel 18 rotatably mounted to the front wheel shaft 17.

The rear wheel suspending section 24 includes a pivot shaft 25 spanning in the vehicle width direction on the pivot frame 23 of the body frame 11, a swing arm 26 extending toward behind the vehicle from the pivot shaft 25, a rear wheel shaft 27 spanning the rear end of the swing arm 26, a rear wheel 28 mounted to this rear wheel shaft 27, and a cushion unit, not shown, spanning between the swing arm 26 and the body frame 11.

Next, a body cover and the like will be described.

The front part of the body frame 11 is covered by a plastic front cowl 41, and parts extending from underneath the fuel tank 31 to an area below the engine 12 and the front part underneath the seat 32 are covered by a plastic mid-cowl 42 and, continuing from the mid-cowl 42, the rear part underneath the seat 32 is covered by a rear cowl 43. A headlight 33 is mounted to the front end of the front cowl 41. A front fender 45, for keeping mud off the front wheel 18, is mounted to the front fork 16 above the front wheel 18, and a rear fender 46 for keeping mud off the rear wheel 28 is mounted to the rear end of the body frame 11. Rider's footrests 47 and 47 (only the reference sign 47 nearer to the viewer is shown) on which the rider, out of the occupants, can set his or her feet on are mounted to the body frame 11 and, behind these rider's footrests 47 and 47, pillion passenger's footrests 48 and 48 (only the reference sign 48 nearer to the viewer is shown) on which the pillion passenger, out of the occupants, can set his or her feet on are mounted to the body frame 11 via pillion passenger's step stays 49 and 49 (only the reference sign 49 nearer to the viewer is shown).

The engine 12 is a transversely mounted two-cylinder four-cycle engine whose crankshaft extends in the vehicle width direction. The engine 12 includes a crankcase 51 and a cylinder part 52 extending ahead toward obliquely above the vehicle from the crankcase 51; an intake device 60 is mounted to the rear wall 53 of the cylinder part 52; and an exhaust pipe 91 of an exhaust system is connected to the front wall 54 of the cylinder part 52.

An exhaust system 90 includes a main exhaust pipe 91 extending from the engine 12, a catalytic converter 92 interposed midway in the exhaust pipe 91 to purify exhaust gas, and a muffler 93 connected to the rear end of the exhaust pipe 91. The muffler 93 is mounted to the pillion passenger's step stay 49 on the right side. The catalytic converter 92 is covered by a metallic heat shield 101. Further, a front end of the muffler 93 is covered by a decorative metallic cover 102.

Figure 2:
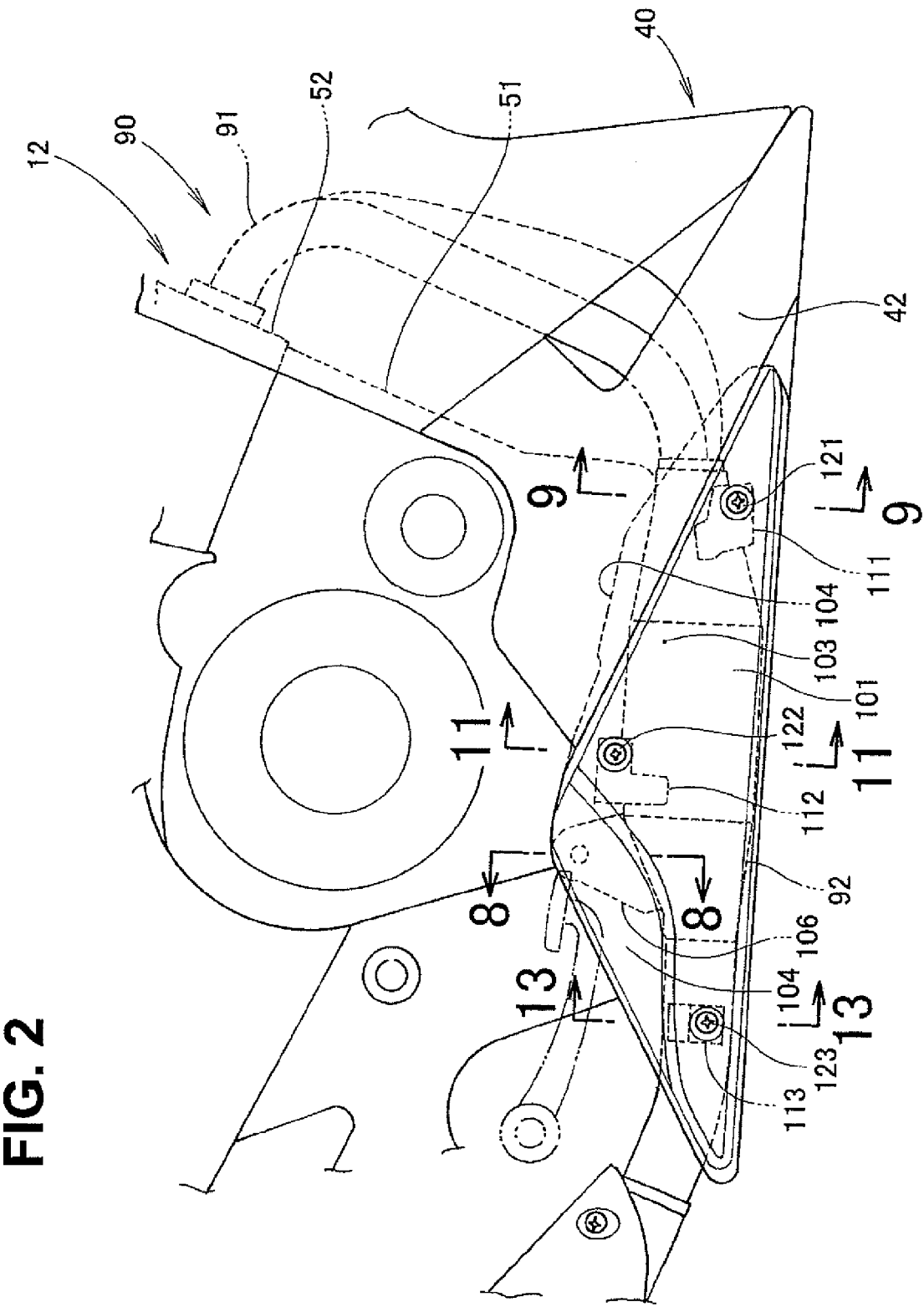
FIG. 2 shows an enlarged view of an essential part of FIG. 1.

As shown in FIG. 2, the catalytic converter 92, which is a component of the exhaust system 90, is covered by the heat shield 101. The heat shield 101 has a continuous face 103 continuous to the mid-cowl 42 as a constituent element of a body cover 40. The heat shield 101 is formed in a tabular shape, and partially formed with a recess 104. It is configured so that the heat shield 101 and the mid-cowl 42 cooperate to define an external face of the vehicle. The body cover 40 including the mid-cowl 42 is formed of plastic, and the heat shield 101 is made of metal (e.g. a steel sheet).

Next, the arrangement and other aspects of upstream exhaust pipes and the catalytic converter constituting the upstream side of the exhaust system will be described.

Figure 3:
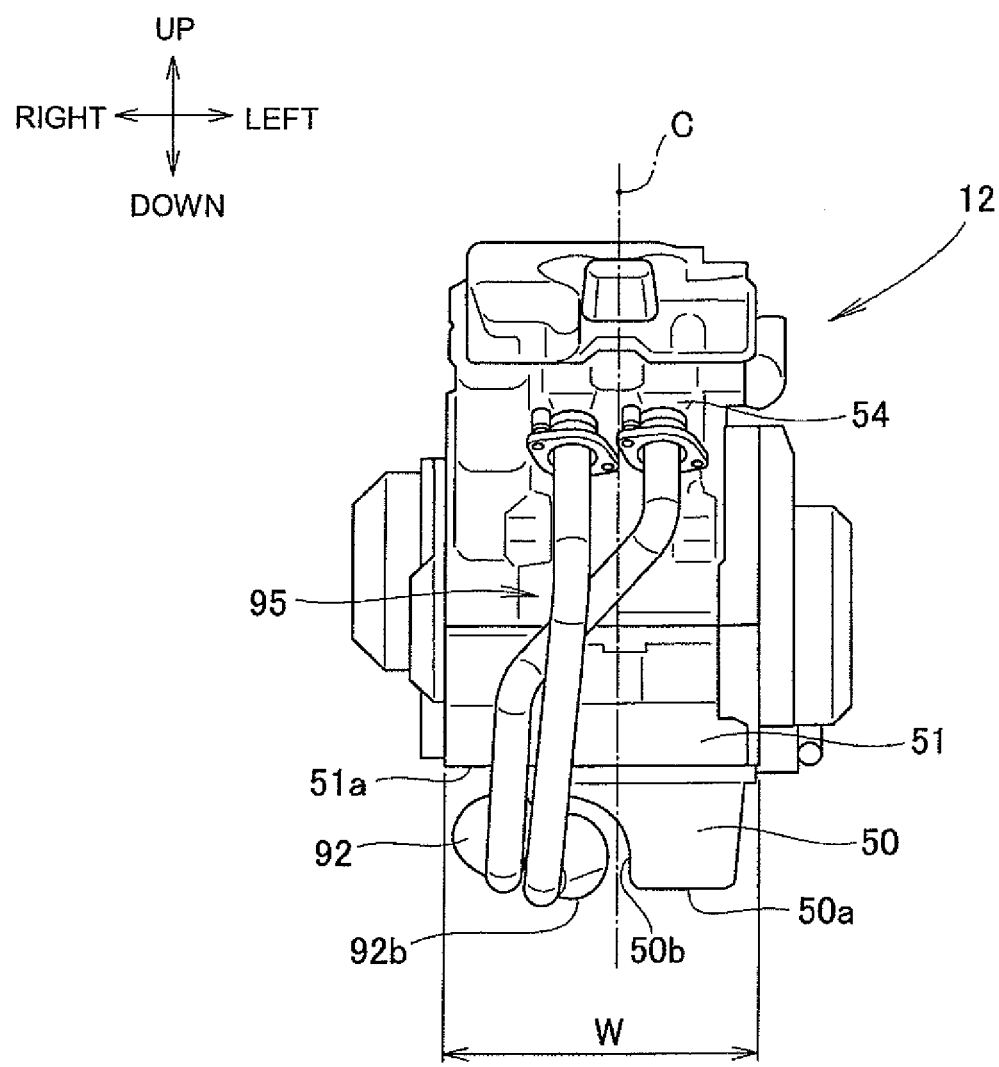
FIG. 3 shows a front view of an exhaust system extending from an engine.

As shown in FIG. 3, two exhaust pipes (upstream exhaust pipes 95) extend from the front wall 54 of the cylinder part, and the two upstream exhaust pipes 95 are linked to the catalytic converter 92.

In the bottom part of the crankcase 51, an oil pan 50 forming an oil sump is arranged. The oil pan 50 is arranged to the left in the vehicle width direction relative to a center line C in the vehicle width direction, and the catalytic converter 92 is arranged to the right in the vehicle width direction. The oil pan 50 is arranged to the left in the widthwise direction of the vehicle, the catalytic converter 92 is arranged to be accommodated within the width W of the crankcase 51, and the lower part 92b of the catalytic converter 92 is made to substantially coincide with the bottom face 50a of the oil pan 50. Further, as the catalytic converter 92 is arranged to run along an external face 50b of the oil pan and the bottom face 51a of the crankcase, the configuration around the oil pan 50 can be made compact.

Figure 4:
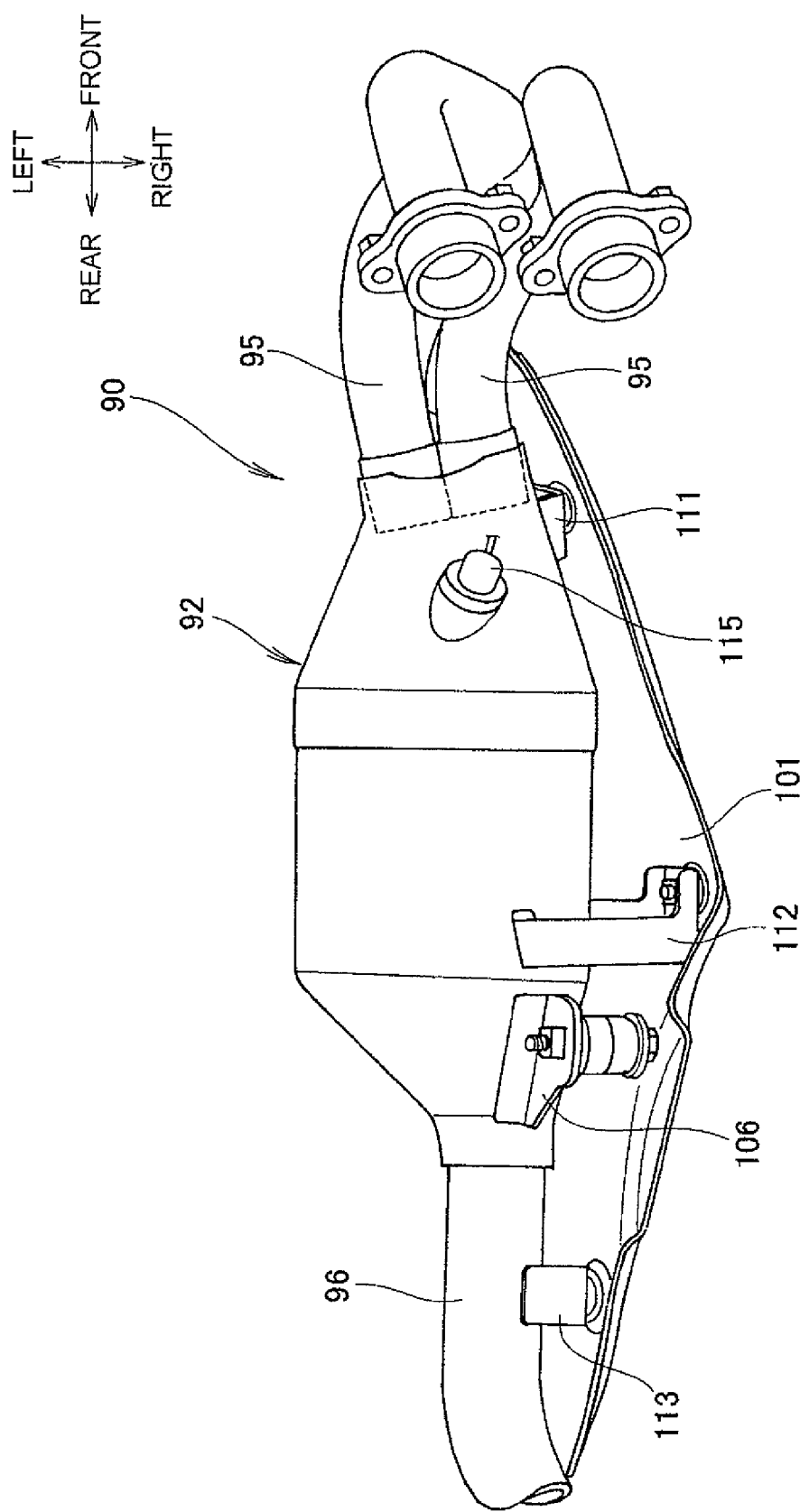
FIG. 4 illustrates an installation structure of a heat shield.

As shown in FIG. 4, the front half of the exhaust system 90 is configured of the upstream exhaust pipes 95 and 95 extending substantially downward from the engine (FIG. 3, reference sign 12) and connected to the upstream end of the catalytic converter 92, the case-shaped catalytic converter 92 having a built-in catalyst unit (FIG. 5, reference sign 97) that is connected to the rear ends of these upstream exhaust pipes 95 and 95 and purifies exhaust gas. A downstream exhaust pipe 96 extends from the rear end of the catalytic converter 92 toward the rear part of the vehicle. The heat shield 101 is mounted to the catalytic converter 92 of the exhaust system 90.

Figure 5:
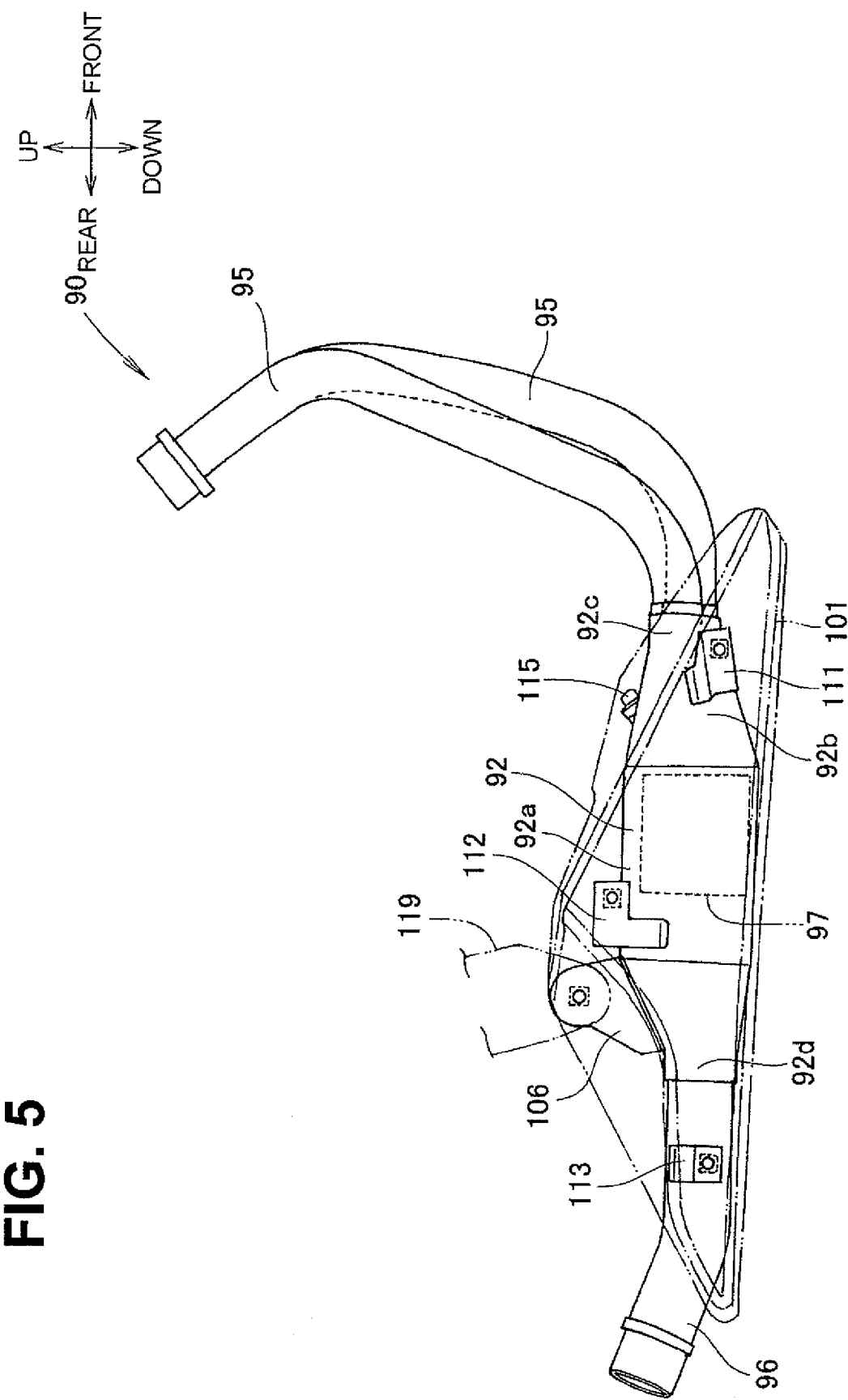
FIG. 5 is a profile that illustrates covering of a catalytic converter with a triangular heat shield.

As shown in FIG. 5, the catalytic converter 92 of the exhaust system 90 is mounted to a structural support member 119 on the side of the body frame with a mounting stay 106 projecting upward from the upper end of the catalytic converter 92. Next, the heat shield 101 is mounted to a first supporting stay 111 joined to the front part of the catalytic converter 92, a second supporting stay 112 joined to the rear part of the catalytic converter 92 and a third supporting stay 113 joined to the downstream exhaust pipe 96.

A sensor 115, which may be an oxygen sensor, is mounted to the upper part of the catalytic converter 92. The heat shield 101 is formed to cover the sensor 115 together with the catalytic converter 92. Namely, the catalytic converter 92 and the sensor 115 are covered by the heat shield 101. Since no dedicated component is separately required to cover the sensor 115, the number of required components can be reduced.

Next, foil members adhering to the rear face of the heat shield will be described.

Figure 6:
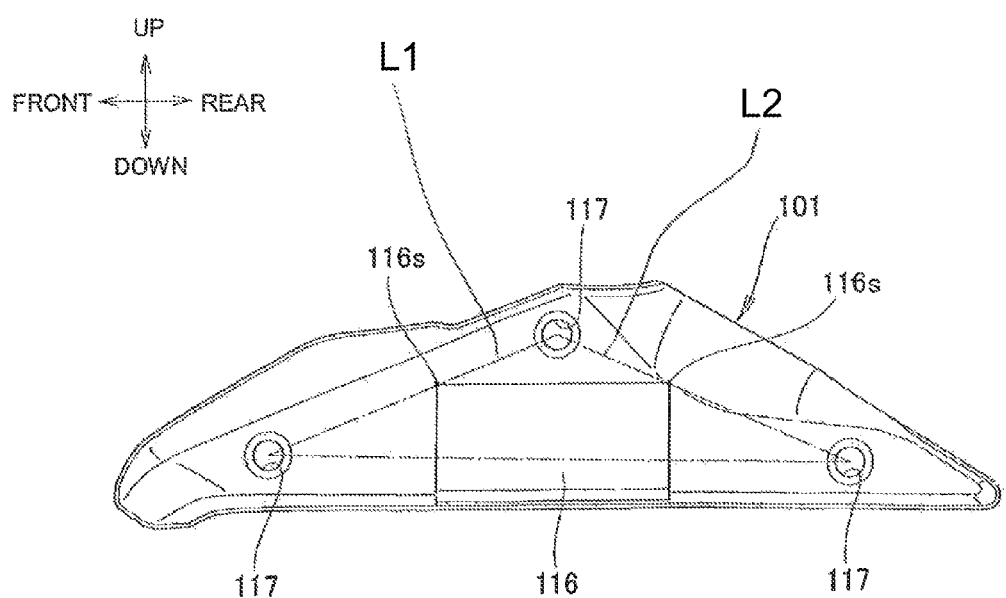
FIG. 6 shows a profile of the heat shield as viewed from inside in a vehicle width direction.

As shown in FIG. 6, to the rear side of the heat shield 101 as viewed from inside in the vehicle width direction, a rectangular metallic foil member 116 adheres. The foil member 116 so adheres to the heat shield 101 that the left and right corners 116s and 116s of the foil member are respectively positioned on a line L1 connecting the centers of holes 117 and 117 into which a first fastening screw (FIG. 7, reference sign 121) and a second fastening screw (FIG. 7, reference sign 122) are fastened, and on a line L2 connecting the centers of the holes 117 and 117 into which the second screw 122 and a third screw (FIG. 7, reference sign 123) are fastened. As the metallic foil member 116 is adhering to the heat shield 101, the surface rigidity of the heat shield 101 can be enhanced thereby to reduce the vibration of the heat shield 101.

In following FIGS. 7 to 11, supporting structures and other aspects of the catalytic converter and the heat shield will be described.

Figure 7:
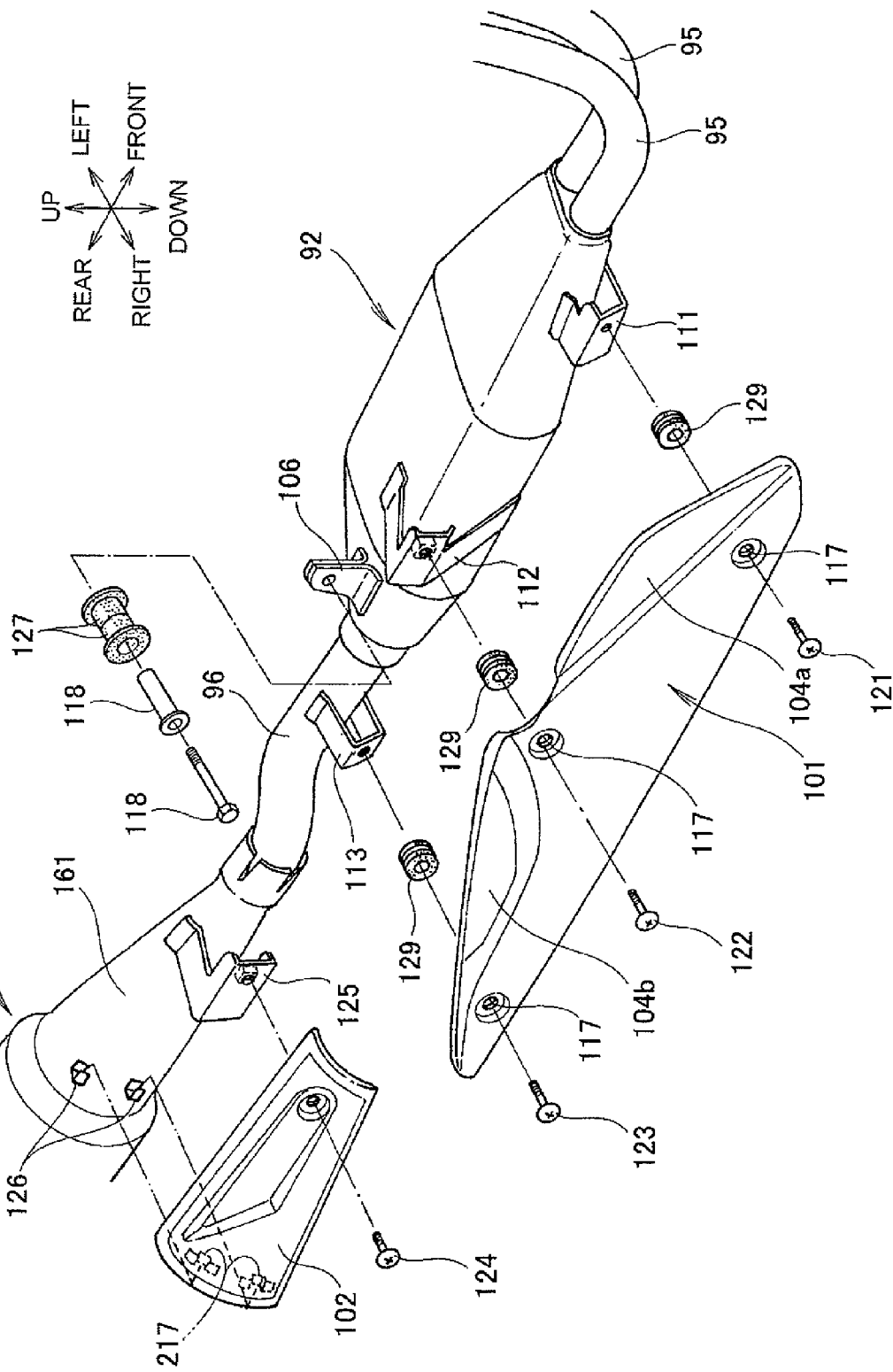
FIG. 7 is an exploded perspective view that illustrates mounting of a heat shield and a decorative plate to the exhaust system.

As shown in FIG. 7, the mounting stay 106 is disposed on the catalytic converter 92 so as to protrude upwardly thereon, and the mounting stay 106 is mounted by a catalyst fixing bolt 118 to a structural support member119 on a side of the body frame (FIG. 5). Next, the heat shield 101 is mounted with the first screw 121 to the first supporting stay 111, with the second screw 122 to the second supporting stay 112 and with the third screw 123 to the third supporting stay 113. Between the heat shield 101 and the first to third supporting stays 111, 112 and 113, elastic members 129 are interposed, and the heat shield 101 is rubber-mounted. The elastic members 129 are formed from a material having high heat tolerance.

The muffler 93 is provided with a fastening part 125 for mounting the decorative cover 102 thereon, and the decorative cover 102 is fastened to the fastening part 125 with a fourth screw 124. Behind the fastening part 125, a decorative cover locking part 126 is joined to the muffler 93, and engaging parts 217 of the decorative cover are disposed to be able to engage with the decorative cover locking part 126.

Next, the supporting structure for the catalytic converter 92 will be described.

Figure 8:
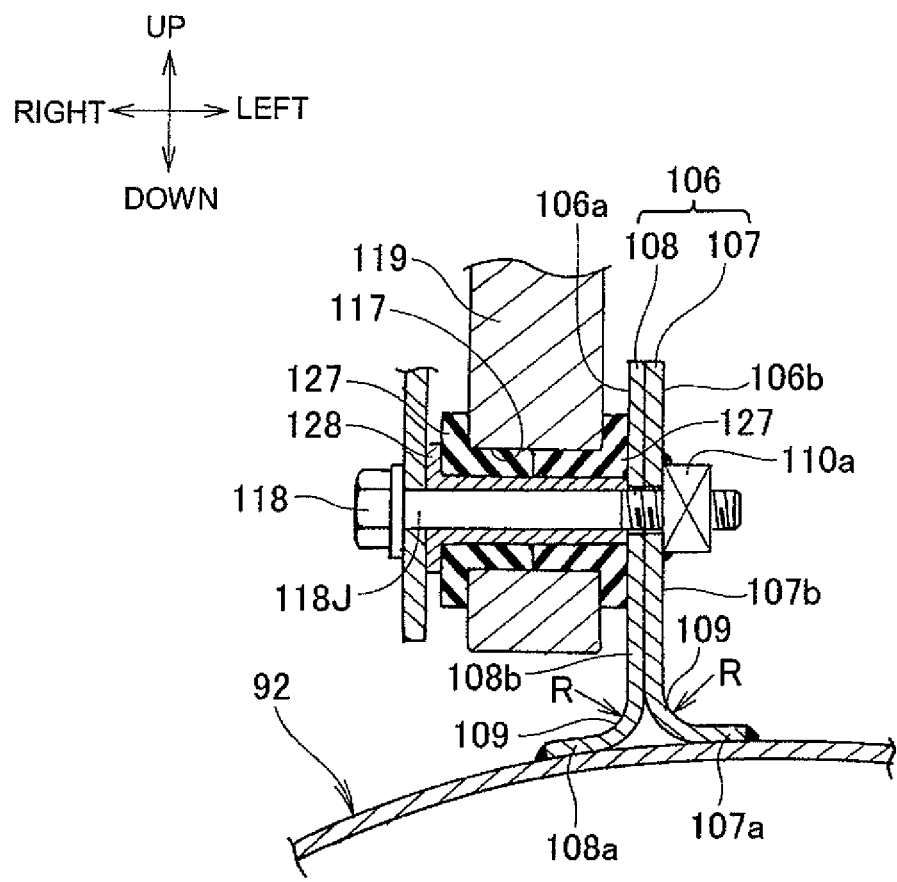
FIG. 8 shows a section cut by line 8-8 in FIG. 2.

As shown in FIG. 8, the mounting stay 106 to be joined to the catalytic converter 92 is composed by butting the respective rear faces of an internal member 107 and an external member 108 each substantially L-shaped as seen from the rear part of the vehicle. The internal member 107 is composed of a leg part 107a and a vertical part 107b extending upward from the leg part 107a. Similarly, the external member 108 is composed of a leg part 108a and a vertical part 108b. As R parts 109 and 109 each having a radius R smoothly span the space between the leg parts 107a and 108a and between the vertical parts 107b and 108b, stress concentration on the R parts 109 and 109 can be avoided.

A weld nut 110a is joined to an internal face 106b of the mounting stay 106, and the catalytic converter 92 of the exhaust system 90 is mounted to a structural support member 119 on the side of the body frame by aligning a hole part 117 of the member 119 on the side of the body frame with an external face 106a of the mounting stay 106 in a position matching the weld nut 110a and using the catalyst fixing bolt 118.

Next, a rubber-mounted supporting structure for the catalytic converter 92 will be described. A collar 128 is inserted around a shaft part 118J of the catalyst fixing bolt 118, the catalyst fixing bolt 118 integrated with the collar 128 is inserted into elastic members 127 and 127 fitted to the hole part 117 of the structural support member 119 on the side of the body frame in advance, and the catalyst fixing bolt 118 is fastened to the weld nut 110a to be fixed on the side of the mounting stay 106. Namely, as the catalytic converter 92 is rubber-mounted, it is made difficult for the vibration of the catalytic converter 92 to be transmitted to the structural support member 119 on the side of the body frame and, at the same time, it is made difficult for the vibration of the structural support member 119 on the side of the body frame to be transmitted to the catalytic converter 92.

In following FIGS. 9 to 13, the supporting structure and other aspects of the heat shield will be described in detail.

Figure 9:
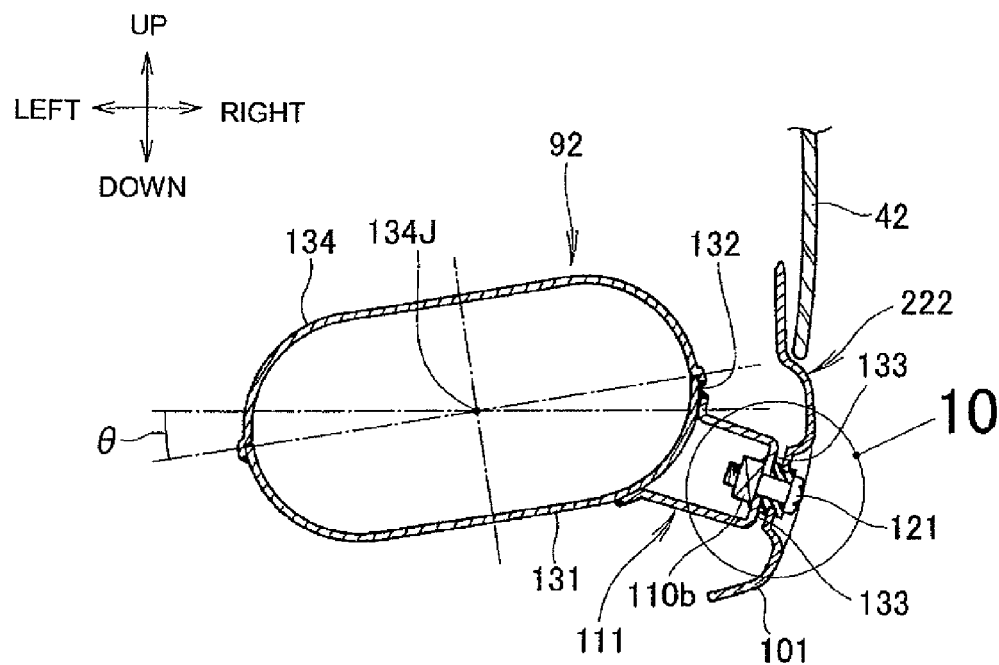
FIG. 9 shows a section cut by line 9-9 in FIG. 2.

As shown in FIG. 9, the first supporting stay 111 abuts on and at the same time is joined to a bottom face 131 and an external face 132 both of the catalytic converter 92. And the heat shield 101 abuts on a seat face 133 of the first supporting stay 111, and the heat shield 101 is mounted to the first supporting stay 111 via the first screw 121 and a weld nut 110b.

As the catalytic converter 92 is so arranged that the outside of an oblong part 134 inclines upward by an angle q, as viewed from the rear of the vehicle, relative to the horizontal plane based on the center 134J of the oblong part 134 having an oblong section, the banking angle of the vehicle can be readily secured. With reference to the next drawing, rubber-mounted structure of the catalytic converter 92 will be described.

Figure 10:
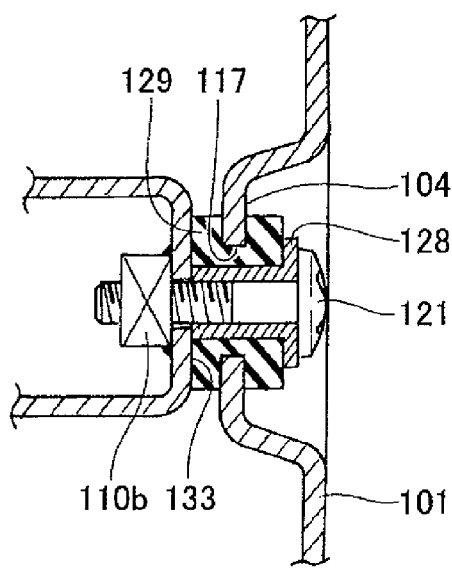
FIG. 10 shows an enlarged view of an area 10 in FIG. 9.

As shown in FIG. 10, the perforated recess 104 representing a dish-like section and having the hole part 117 into which the first screw 121 is to be fastened is formed in the heat shield 101, and the elastic members 129 and the collar 128 are fitted to the perforated recess 104, and the heat shield 101 is mounted to the first supporting stay 111 with the first screw 121 and the weld nut 110b. Note that the installation structures of the second supporting stay and the third supporting stay which will be described later are rubber-mounted supporting having the same structure as described above, and therefore their description is omitted.

Figure 11:
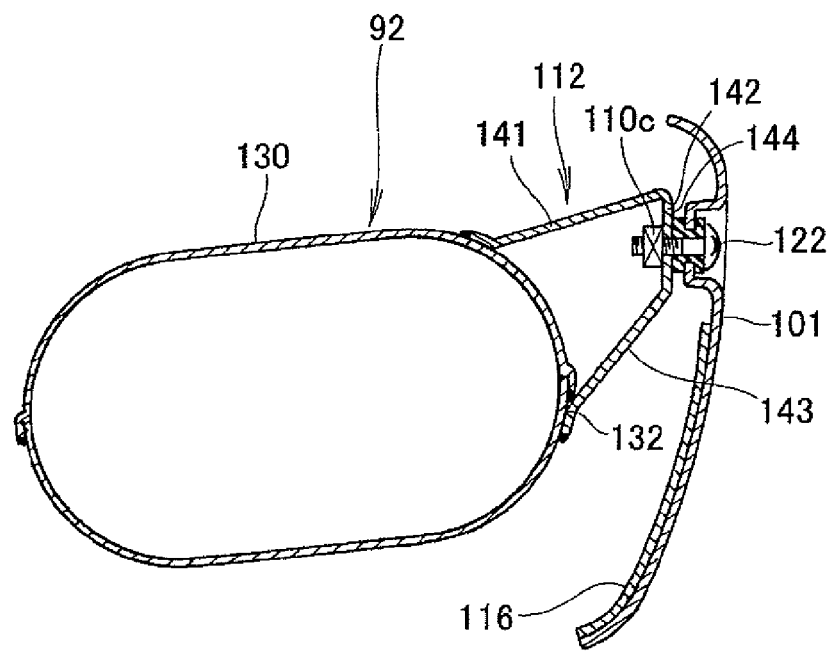
FIG. 11 shows a section cut by line 11-11 in FIG. 2.

As shown in FIG. 11, the second supporting stay 112 abuts on and at the same time is joined to a ceiling face 130 and the external face 132 of the catalytic converter 92. The second supporting stay 112 comprises a first extending part 141 extending from the ceiling face 130 of the catalytic converter 92 toward outside of the vehicle, a vertical part 142 which extends from the outer end of the first extending part 141 and to which the heat shield 101 is mounted, and a second extending part 143 extending from the lower end of the vertical part 142 to the external face 132 of the catalytic converter 92. And the heat shield 101 abuts on a seat face 144 constituting part of the vertical part 142 of the second supporting stay 112, and the heat shield 101 is mounted to the second supporting stay 112 via the second screw 122 and the weld nut 110c.

Figure 12:
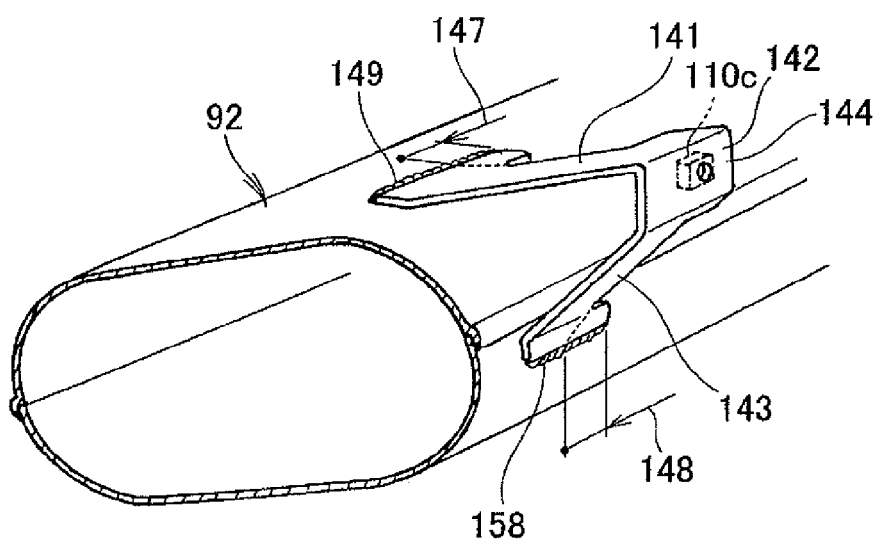
FIG. 12 shows a perspective view of an upper member supporting part in FIG. 11.

As shown in FIG. 12, the ends of the first extending part 141 and the second extending part 143 joined to the catalytic converter 92 respectively have a first protruding part 147 and a second protruding part 148 each extending in a longitudinally axial direction of the catalytic converter 92, and these first protruding part 147 and second protruding part 148 respectively constitute some of joints 149 and 150. The joints 149 and 150 are elongated by these first protruding part 147 and second protruding part 148, and stress concentration on the joints 149 and 150 is therefore avoided.

Figure 13:
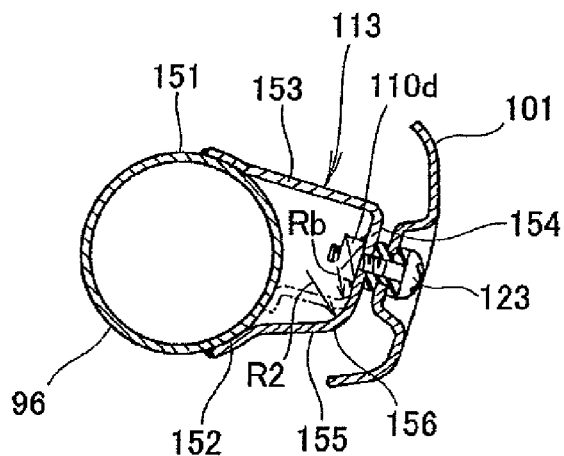
FIG. 13 shows a section cut by line 13-13 in FIG. 2.

As shown in FIG. 13, the third supporting stay 113 abuts on and at the same time is joined to the upper face 151 and the lower side face 152 of the downstream exhaust pipe 96. The third supporting stay 113 is composed of an extending upper part 153 extending toward outside the vehicle from the upper face 151 of the downstream exhaust pipe, a seat part 154 extending downward from an external end of the extending upper part 153 and mounted to the heat shield 101, and an extending lower part 155 extending from the lower end of the seat part 154 to the lower side face 152 of the downstream exhaust pipe 96. And the heat shield 101 abuts on the seat part 154 of the third supporting stay 113, and the heat shield 101 is mounted to the third supporting stay 113 via the third screw 123 and the weld nut 110d.

Here, the section between the seat part 154 and the extending lower part 155 is given a radius R2 greater than the conventional radius Rb (Rb<R2), and the length of the extending lower part 155 extending to the lower side face 152 of the downstream exhaust pipe 96 is increased by smoothly spanning the space between the seat part 154 and the extending lower part 155 with an R2 section 156 having a radius R2. By elongating the extending lower part 155 to substantially equalize its length to that of the extending upper part 153 in this way, it is possible to make the load on the third supporting stay 113 more difficult to become uneven than on a conventional third supporting stay (represented by an imaginary line in the diagram).

Next, the foregoing will be summed up. In FIG. 5 and FIG. 7, the exhaust system 90 has the catalytic converter 92 containing the catalyst unit 97 within, and the heat shield 101 is held by the upper part 92a and the lower part 92b of the catalytic converter 92. Further, the exhaust system 90 has the upstream exhaust pipes 95 and 95 connected to the front end 92c of the catalytic converter 92 and the downstream exhaust pipe 96 connected to the rear end 92d of the catalytic converter 92, and in addition the heat shield 101 is also held by the third supporting stay 113 of the downstream exhaust pipe 96.

As the heat shield 101 is held in two upper and lower positions, of the catalytic converter 92, the mounting rigidity of the heat shield 101 especially against up-and-down vibration can be enhanced. Furthermore, the heat shield 101, in addition to being held by the upper part 92a and the lower part 92b of the catalytic converter, the rear part of the heat shield 101 is held by the downstream exhaust pipe 96. Besides against the up-and-down vibration applied to the exhaust system 90, the front part or the rear part of the heat shield 101 is held, with the result that the mounting rigidity of the exhaust system 90 can also be enhanced against the oscillation in the vehicle width direction at the time of turning (run-out).

Incidentally, though the heat shield is supported by the downstream exhaust pipe, it may as well be supported by the upstream exhaust pipe or by both the upstream exhaust pipe and the downstream exhaust pipe.

The heat shield 101 is formed into a substantially triangular shape to cover the whole catalytic converter 92. The catalytic converter 92 is arranged at the center of the substantially triangular heat shield 101 to have the catalytic converter 92 held in a position close to the apex of the substantially triangular heat shield 101. In addition to covering the whole catalytic converter 92 with the substantially triangular heat shield 101, the heat shield 101 can be securely supported by the catalytic converter 92.

In following FIGS. 14 to 15, the downstream end of the upstream exhaust pipe will be described.

Figure 14:
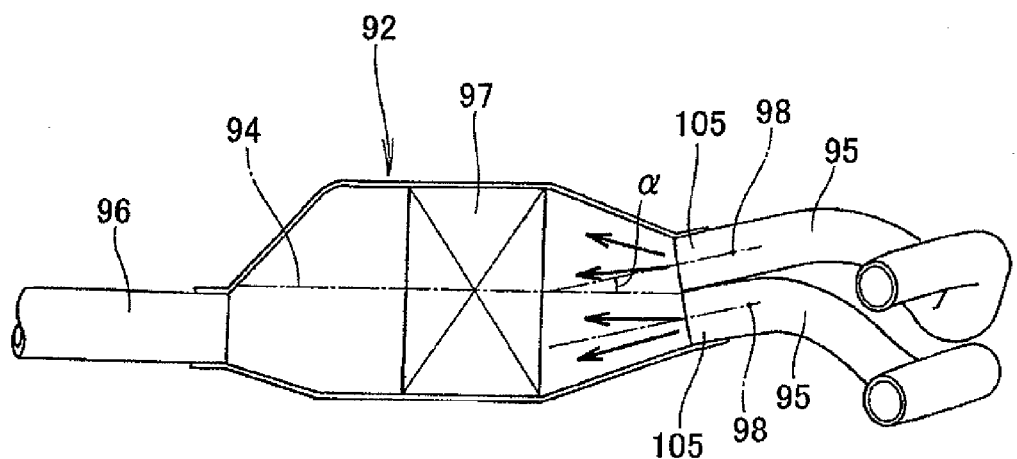
FIG. 14 illustrates a flow of exhaust gas to the catalytic converter.

As shown in FIG. 14, axes 98 and 98 at the downstream ends 105 and 105 of the upstream exhaust pipes 95 and 95 in a planar view are inclined by an angle a relative to the direction of the longitudinal axis 94 of the catalytic converter 92. That is, as the direction of the downstream ends 105 of the upstream exhaust pipes 95 are inclined by the angle a relative to the longitudinal axis 94 of the catalytic converter 92, the area in which exhaust gas comes into contact with the catalyst unit 97 is increased to increase the quantity of contact of exhaust gas.

Figure 15:
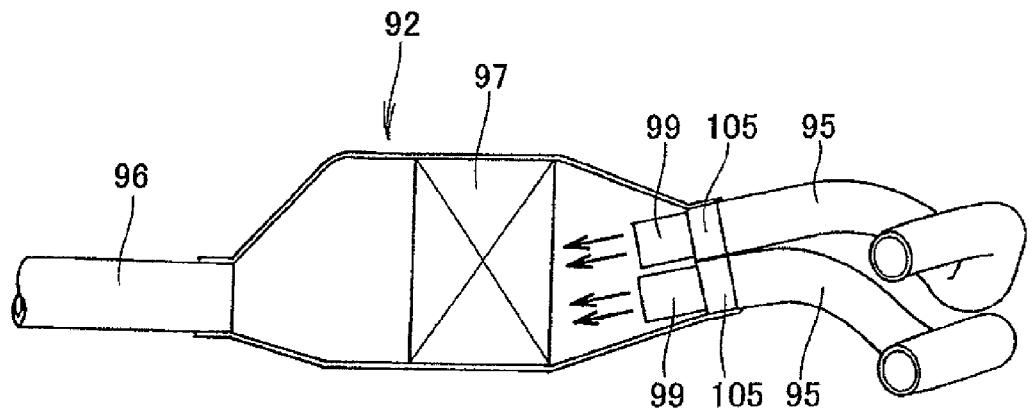
FIG. 15 shows another version of an embodiment shown in FIG. 14.

As shown in FIG. 15, the difference from the embodiment shown in FIG. 14 consists in that cylindrical collar members 99 and 99 extend to the side of the catalyst unit 97 of the downstream ends 105 and 105 of the upstream exhaust pipes, but other aspects of the configuration are the same. The collar members 99 and 99 are protruded from the input side end of the catalytic converter.

In FIG. 15, the collar members 99 and 99 are protruded into the inside of the catalytic converter 92.

In FIG. 14, as the downstream ends 105 and 105 of the upstream exhaust pipes are not protruded into the inside of the catalytic converter 92, differences in exhaust timing among individual cylinders are apt to invite a phenomenon of mutual influencing of exhaust gases flowing in these exhaust pipes 95 and 95 (exhaust interference).

In this respect, in FIG. 15, as the collar members 99 and 99 protruding toward the catalyst unit 97 are protruded toward the downstream ends 105 and 105 of the upstream exhaust pipes, exhaust interference can be restrained.

Next, the muffler constituting the downstream side of the exhaust system will be described.

Figure 16:
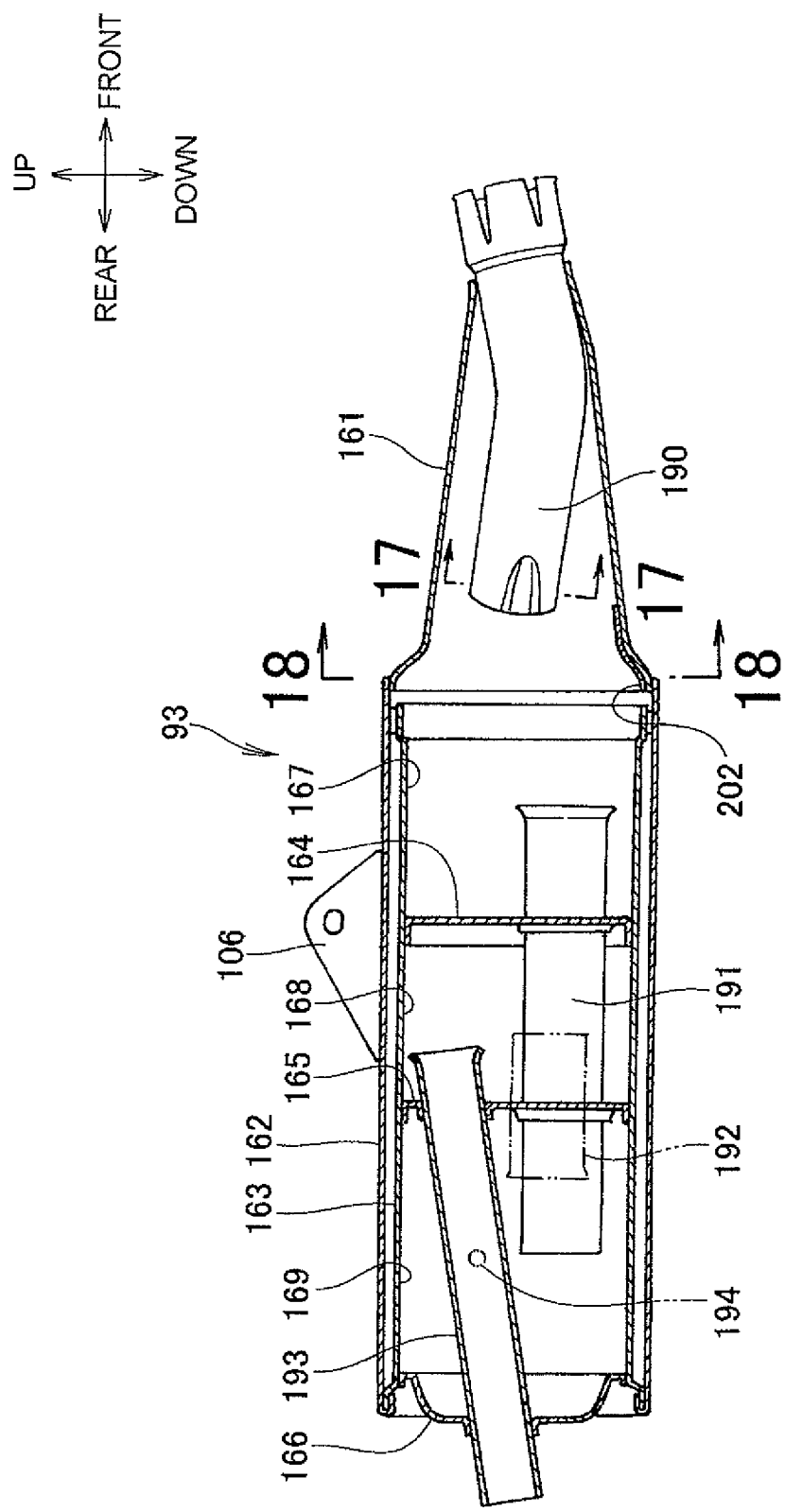
FIG. 16 shows a section of a muffler.

As shown in FIG. 16, the muffler 93 has a conically shaped conic outer cylinder 161 disposed on the upstream end, an outer cylinder 162 connected to the rear end of the conic outer cylinder 161, an inner cylinder 163 supported inside the outer cylinder 162, a first separator 164 and a second separator 165 extending in a direction at a right angle to the longitudinal axis of the inner cylinder 163 and partitioning the inner cylinder 163, and a rear cap 166 that closes the rear end part of the inner cylinder 163.

The muffler 93, where a space formed by the first separator 164 and the conic outer cylinder 161 in the vehicle front area of the first separator 164 is made to serve as a first chamber 167, a space partitioned by the first separator 164 and the second separator 165 as a second chamber 168 and a space partitioned by the second separator 165 and the rear cap 166 as a third chamber 169, has in the conic outer cylinder 161a front pipe 190 protruded into the first chamber 167 to the rear inside of the conic outer cylinder 161, a first pipe 191 that is supported by the first separator 164 and the second separator 165 and causes exhaust gas to flow from the first chamber 167 to the third chamber 169, a second pipe 192 that is supported by the second separator 165 and causes exhaust gas to flow from the third chamber 169 to the second chamber 168, and a tail pipe 193 that is supported by the second separator 165 and the rear cap 166 and causes exhaust gas to flow from the second chamber 168 to the outside. A bypass hole 194 for bypass use is bored in substantially the central part of the tail pipe 193 in the longitudinal direction.

Exhaust gas having entered from the downstream exhaust pipe 96 into the muffler 93 reaches the first chamber 167 past the front pipe 190, and exhaust gas in the first chamber 167 reaches the third chamber 169 past the first pipe 191, reaches the second chamber 168 from the third chamber 169 past the second pipe and is discharged out from the second chamber 168 past the tail pipe 193.

Figure 17:
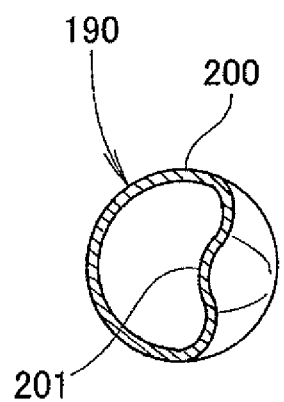
FIG. 17 shows a section cut by line 17-17 in FIG. 16.

As shown in FIG. 17, the rear end part 200 of the front pipe is formed with an indentation 201 recessed inwardly to form a substantially crescent shaped cross-section. The indentation 201 guides the flowing direction of exhaust gas in a prescribed direction.

Figure 18:
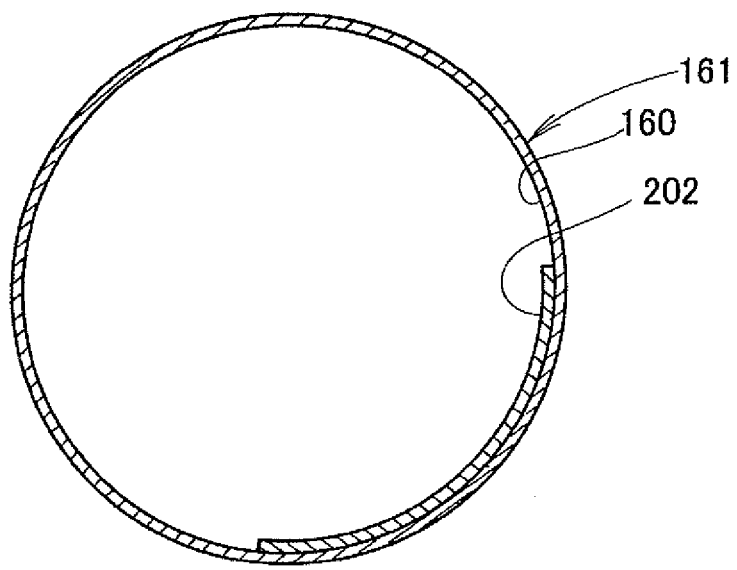
FIG. 18 shows a section cut by line 18-18 in FIG. 16.

As shown in FIG. 18, a cover plate 202 is joined to the conic outer cylinder 161. This cover plate 202 includes an arcuate section, and is intended to deflect exhaust gas flowing into the muffler by preventing it from directly hitting the inner wall 160 of the conic outer cylinder 161. Various forms are available for application to the surface of the cover plate 202. The details will be described further below.

Figure 19:
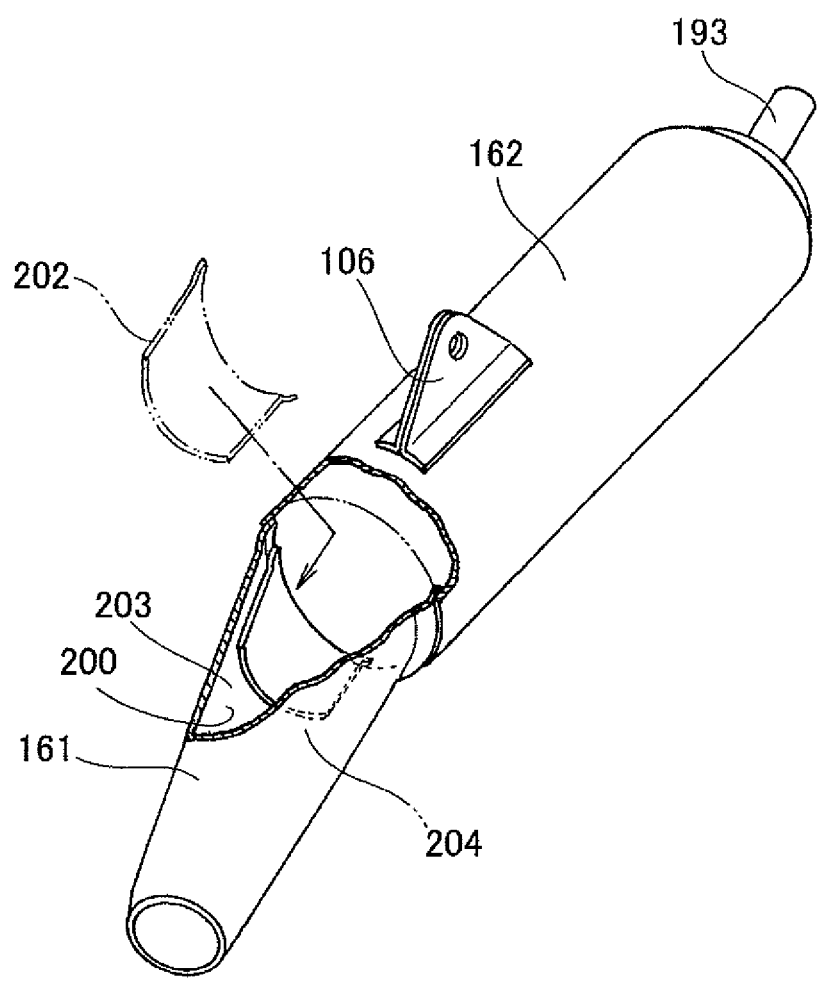
FIG. 19 is an exploded perspective view of a mounting position of a heat shield plate in a muffler.

As shown in FIG. 19, the cover plate 202 adheres to the inner face (or inner wall 200) of the conic outer cylinder from a side face 203 to the bottom face 204 of the conic outer cylinder 161. As the deflector plate protectively covers part of the inner wall 200, exhaust gas is deflected by the cover plate 202 adhering to the inner wall 200, and the exhaust gas is thereby prevented from directly hitting inner wall of the conic outer cylinder 161.

Next, the surface shape of the cover plate 202 will be described.

Figure 20A:
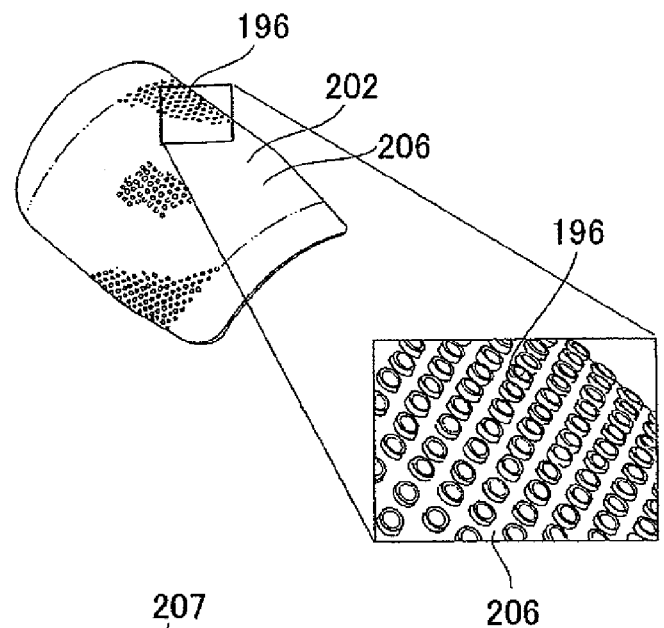
FIG. 20A illustrates a surface shape of a heat shield plate for the muffler according to a first embodiment.

As shown in FIG. 20A, the cover plate 202 is a porous plate 206 having many raised or textured areas 196 formed in the surface. By forming the porous plate 206 in such a configuration, exhaust gas having hit the porous plate 206 is made easier to be diffused in the first chamber 167 (FIG. 16).

Figure 20B:
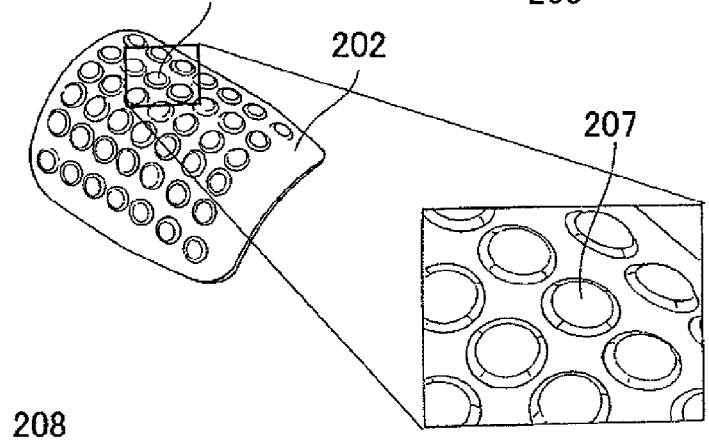
FIG. 20B illustrates a surface shape of a heat shield plate for the muffler according to a second embodiment.
Figure 20C:
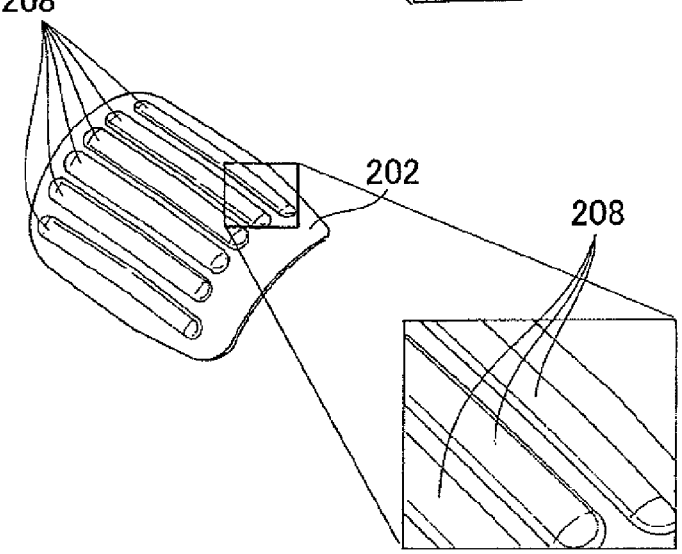
FIG. 20C illustrates a surface shape of a heat shield plate for the muffler according to a third embodiment.

FIG. 20B shows another, alternative embodiment of a cover plate 202 which may be used to cover a part of the conic outer cylinder 161, and FIG. 20C illustrates a third alternate embodiment of a cover plate 202 which may be used to cover a part of the conic outer cylinder.

As shown in FIG. 20B, many substantially hemispheric projections 207 may be formed on the surface of the cover plate 202.

As shown in FIG. 20C, many projecting belt parts 208, whose section is arcuately belt-shaped, may alternatively be formed on the surface of the cover plate 202. By forming the surface of the cover plate 202 into an uneven shape in this way, exhaust gas having hit the cover plate 202 is made easier to be diffused.

Next, the effect of combination of the indentation of the front pipe and the heat shield plate will be described.

As shown in a comparative example of FIG. 21B, part of exhaust gas having left the front pipe 190 directly hits the inner wall 160 of the conic outer cylinder 161 in the first chamber. As a result, the temperature of the conic outer cylinder 161 hit by the high-temperature exhaust gas locally rises, sometimes inviting partial discoloring of the outer wall, adversely affecting the appearance thereof.

In this respect, in the exhaust system of the present invention, as shown by an embodiment of FIG. 21A, a direction of exhaust gas flow is changed by the indentation 201 in the front pipe 190, and it is made difficult for exhaust gas to directly hit the inner wall of the conic outer cylinder 161 in the first chamber. In addition, since the textured cover plate 202 adheres to the inner wall 160 of the conic outer cylinder 161 in a region where exhaust gas coming out of the mouth of the front pipe 190 hits, it is made difficult for exhaust gas to directly hit the inner wall 160 of the conic outer cylinder 161 and, at the same time, exhaust gas having hit the conic outer cylinder 161 is stirred by the cover plate 202 in a porous plate form. Therefore, the temperature rise of the conic outer cylinder 161 is restrained, thereby eliminating or minimizing the problem of discoloring the outer wall.

Next, the supporting structure for the decorative cover to be mounted to the conic outer cylinder of the muffler will be described.

Figure 22A:
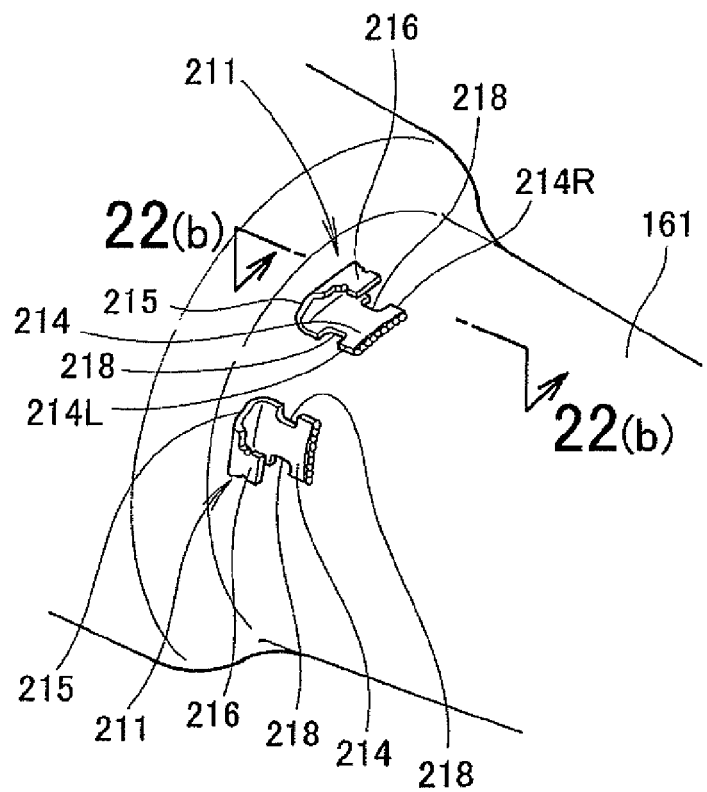
FIG. 22A is a perspective view illustrating a pair of mounting hooks for supporting part of the decorative cover partially covering the muffler.
Figure 22B:
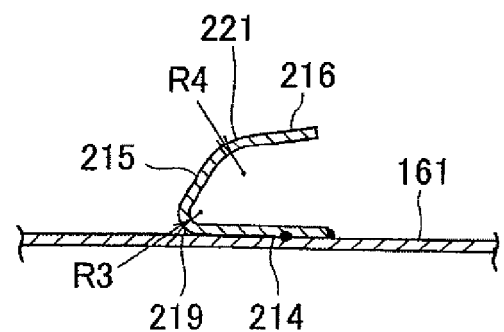
FIG. 22B is a cross-sectional view of one of the mounting hooks of FIG. 22A.
Figure 22C:
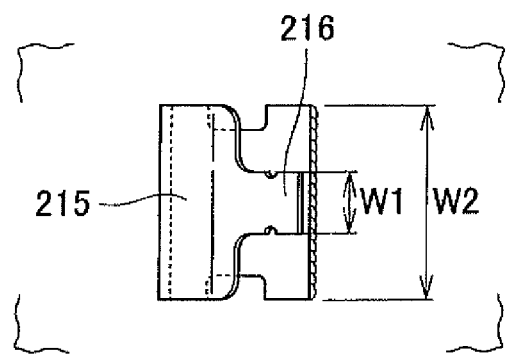
FIG. 22C is a top plan view of one of the mounting hooks of FIG. 22A.

FIG. 22A shows a perspective view of a decorative cover hook which may be mounted on the conic outer cylinder to support the cover plate 202, and FIG. 22 is a cross-sectional view of the hook, taken along the line 22(b)-22(b) in FIG. 22A. FIG. 22C is a top plan view of the decorative cover hook of FIG. 22A.

As shown in FIG. 22A, decorative cover hooks 211 and 211 includes seat parts 214 and 214 to be joined to the conic outer cylinder 161, vertical parts 215 and 215 rising from the end parts of the seat parts 214 and 214, and locking claws 216 and 216 to which engaging parts (FIG. 7, reference sign 217 and 217), folded from the upper ends of the vertical parts 215 and 215 toward the seat parts 214 and 214, of the decorative cover are to be locked.

As the two decorative cover hooks 211 and 211 have the same shape, the following description will describe only the structure of one decorative cover hook 211 as representative.

In FIG. 22C, the width w1 of the locking claw 216 is narrowed in comparison with the width W2 of the vertical part 215 (W1<W2). In FIG. 22A, U-shaped notches 218 and 218, cut in a U-shape inward, are formed in the left and right sides 214L and 214R of the seat part 214 to partly narrow the width of the seat part 214, enabling stress concentration near the welded part to be avoided.

As shown in FIG. 22B, the space between the seat part 214 and the vertical part 215 is spanned by an R3 part 219 of having radius R3. Also, the space between the vertical part 215 and the locking claw 216 is spanned by an R4 part 221 of a radius R4. By setting here a relationship of R3<R4 between the radius R3 having the wider R3 part 219 spanning the space between the seat part 214 and the vertical part 215 and the radius R4 of the narrower R4 part spanning the space between the locking claw 216 and the vertical part 215, a shape of a good strength balance is formed. Furthermore, by extending the seat part 214 and the locking claw 216 in the same direction, and forming the decorative cover hook 211 into a U shape and bending the same in the same direction as above, the degree of freedom in shape alteration is increased.

Effects of the small vehicle exhaust system will be described next.

As shown in an embodiment of FIG. 23A, the heat shield 101 covering a lateral side of the exhaust system 90 has the continuous face 103 which is substantially flush with, and visually continuous with the body cover 40, and these heat shield 101 and body cover 40 cooperate with each other to define the external face of the vehicle.

On the other hand, as shown in a comparative example of FIG. 23B, a heat shield 101B covering a lateral side of an exhaust system has no continuously extending face continuing to a mid-cowl 42B, which is a constituent element of a body cover 40B. On its boundary with the heat shield 101B, the mid-cowl 42B has a front opening 231B for taking the external air in and a mounting part 232B which is extended to the body frame and to which the first screw 121B is fastened, and linkage between the mid-cowl 42B and the heat shield 101B in the aesthetic design aspect leaves room for improvement.

According to the present invention, as in an embodiment of FIG. 23A, since the heat shield 101 is provided with the face 103 closely adjacent and visually continuous to the body cover 40, there is no need to shape the body cover 40 to cover and conceal the lateral side of the exhaust system. As a result, it is possible to cover the exhaust system 90 with the heat shield 101 while enhancing the degree of freedom in shape of the body cover. As the degree of freedom in shape of the body cover is enhanced, the appearance quality of the vehicle can be improved.

Besides what has been noted, in the comparative example of FIG. 23B, the heat shield covering a portion of the exhaust system 90 is mounted to the body frame arranged farther inward in the vehicle width direction than the exhaust system 90. As part of the heat shield mounted to the body frame is extended inward in the vehicle width direction, the degree of freedom in shape of the heat shield is restricted in some cases.

In this respect, according to the present invention, as shown in the embodiment of FIG. 23A, the heat shield 101 is mounted to the exhaust system 90, which is positioned nearer than the body frame 11. As the heat shield 101 is mounted to the exhaust system 90 and arranged in a closer vicinity to the heat shield 101 than the body frame 11, there is no need for such contrivance as to extend part of the heat shield 101. As a result, the degree of freedom in shape of the heat shield 101 can be enhanced.

Further, the heat shield 101 is made of metal and, as shown in FIG. 7, mounted to the exhaust system 90 via the elastic members 129. The elastic members 129 interposed between the heat shield 101 and the exhaust system 90 makes it difficult for vibration to be transmitted from the exhaust system 90 to the heat shield via the elastic members 129, and for the heat shield 101 to cause a resonance phenomenon with respect to the exhaust system 90. The recesses 104 (recesses 104a and 104b) are formed in the heat shield 101. These recesses 104a and 104b serve to enhance the rigidity of the heat shield 101. The enhanced rigidity of the heat shield 101 can give additional restraint on the resonance phenomenon with the catalytic converter 92.

In FIG. 1, FIG. 5 and FIG. 7, the body cover 40 is mounted to the body frame 11, and the heat shield 101 is mounted to the exhaust system 90 via the elastic members 129. The use of different supporting members for the body cover 40 and for the heat shield 101 might give rise to a gap or the like, invited by vibration or the like occurring to the vehicle, in a joining part (FIG. 9, reference sign 222) between the body cover 40 and the heat shield 101.

In this respect, according to the present invention, as the heat shield 101 is mounted to the exhaust system 90 via the elastic members 129, minute shifting of the heat shield 101 is permissible. As a result, a gap or the like is made difficult to occur in the joining part 222 between the body cover 40 and the heat shield 101.

Note that though the present invention is applied to motorcycles in the embodiments thereof, it can as well be applied to three-wheeled vehicles, and there is no problem in its application to small vehicles in general.

[Industrial Applicability]

The present invention is suitable for catalytic converter-equipped motorcycles.

What is claimed is:

1. A small vehicle comprising:
   a vehicle frame;
   an internal combustion engine operatively attached to the vehicle frame;
   an exhaust system that extends downwardly from the internal combustion engine for routing exhaust gas from the internal combustion engine therethrough, the exhaust system comprising:
      a catalytic converter containing a catalyst,
      an upstream exhaust pipe connected to a front end part of the catalytic converter, and
      a downstream exhaust pipe connected to a rear end part of the catalytic converter;
   a body cover that covers at least a lateral side of the internal combustion engine and constitutes part of an external face of the vehicle; and
   a heat shield having a face closely adjacent and substantially visually continuous to the body cover and covering a lateral side portion of the exhaust system, the heat shield and the body cover cooperating to configure at least part of the external face of the vehicle; and, wherein the heat shield is operatively attached to the catalytic converter, and is further supported by at least one of the upstream exhaust pipe and the downstream exhaust pipe.

2. The small vehicle according to claim 1, wherein the body cover is formed of plastic resin, and the heat shield is made of metal and is attached to the exhaust system using heat-resistant elastic members.

3. The small vehicle according to claim 2, wherein the body cover is mounted to the vehicle frame.

4. The small vehicle according to claim 2, wherein the heat shield is formed in a substantially triangular shape as viewed in a side view of the vehicle, and is configured to substantially cover the catalytic converter.

5. The small vehicle according to claim 4, wherein a sensor is mounted to the catalytic converter, and the heat shield is formed to cover both the sensor and the catalytic converter.

6. The small vehicle according to claim 1, wherein the heat shield is formed in a substantially triangular shape as viewed in a side view of the vehicle, and is configured to substantially cover the catalytic converter.

7. The small vehicle according to claim 6, wherein a sensor is mounted to the catalytic converter, and the heat shield is formed to cover the sensor together with the catalytic converter.

8. The small vehicle according to claim 1, wherein the heat shield is formed in a tabular shape, and has at least one recess formed therein.

9. The small vehicle according to claim 1, wherein a sensor is mounted to the catalytic converter, and the heat shield is formed to cover the sensor together with the catalytic converter.

10. A body covering system for a small vehicle having a vehicle frame, an internal combustion engine operatively attached to the vehicle frame, and an exhaust system extending downwardly from the internal combustion engine for routing exhaust gas therefrom, the exhaust system comprising:
    a catalytic converter containing a catalyst,
    an upstream exhaust pipe connected to a front end part of the catalytic converter, and
    a downstream exhaust pipe connected to a rear end part of the catalytic converter; the body covering system comprising:
    a body cover that covers at least a lateral side of the internal combustion engine and constitutes a portion of an external face of the vehicle; and
    a heat shield having a face closely adjacent and substantially visually continuous to the body cover and covering a lateral side portion of the exhaust system, the heat shield and the body cover cooperating to configure at least part of the external face of the vehicle;
    wherein the heat shield is operatively attached to the catalytic converter, and is further supported by at least one of the upstream exhaust pipe and the downstream exhaust pipe.

11. The body covering system according to claim 10, wherein the body cover is formed of plastic resin, and the heat shield is made of metal and is attached to the exhaust system using heat-resistant vibration damping elastic members.

12. The body covering system according to claim 11, wherein the body cover is mounted to the vehicle frame.

13. The body covering system according to claim 11, wherein the heat shield is formed in a substantially triangular shape as viewed in a side view of the vehicle, and is configured to substantially cover the catalytic converter.

14. The body covering system according to claim 10, wherein the heat shield is formed in a substantially triangular shape as viewed in a side view of the vehicle, and is configured to substantially cover the catalytic converter.

15. The body covering system according to claim 10, wherein a sensor is mounted to the catalytic converter, and the heat shield is formed to cover both the sensor and the catalytic converter.

* * * * *